US010750570B2

United States Patent
Jin et al.

(10) Patent No.: US 10,750,570 B2
(45) Date of Patent: *Aug. 18, 2020

(54) CALL TERMINATION METHOD, APPLICATION PROCESSOR, AND MODEM

(71) Applicant: HUAWEI TECHNOLOGIES CO., LTD., Shenzhen, Guangdong (CN)

(72) Inventors: Hui Jin, Beijing (CN); Feng Zhang, Beijing (CN); Songping Yao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/547,212

(22) Filed: Aug. 21, 2019

(65) Prior Publication Data

US 2019/0380168 A1 Dec. 12, 2019

Related U.S. Application Data

(63) Continuation of application No. 16/004,980, filed on Jun. 11, 2018, now Pat. No. 10,433,365, which is a
(Continued)

(51) Int. Cl.
*H04B 1/38* (2015.01)
*H04W 76/30* (2018.01)
(Continued)

(52) U.S. Cl.
CPC ............ *H04W 76/30* (2018.02); *H04W 64/00* (2013.01); *H04W 76/34* (2018.02); *H04W 76/38* (2018.02); *H04W 88/02* (2013.01)

(58) Field of Classification Search
CPC ....... H04W 4/16; H04W 92/02; H04W 76/02; H04W 8/26; H04W 88/06; H04W 88/02
(Continued)

(56) References Cited

U.S. PATENT DOCUMENTS 5,396,484 A 3/1995 Itoh
6,915,211 B2 7/2005 Kram et al.
(Continued)

FOREIGN PATENT DOCUMENTS

CN 2870320 A 2/2007
CN 101159930 A 4/2008
(Continued)

OTHER PUBLICATIONS

3rd Generation Partnership Project;Technical Specification Group Core Network and Terminals; AT command set for User Equipment{UE} {Release 12), TS 27.007 V12.5.0,dated Jun. 26, 2014, 320 pages, XP050774245.
(Continued)

*Primary Examiner* — Temica M Beamer
(74) *Attorney, Agent, or Firm* — Fish & Richardson P.C.

(57) ABSTRACT

Embodiments of the present invention relate to the field of communications technologies, and disclose a call termination method, an application processor, and a modem. In this solution, the application processor receives a hang-up instruction and sends a first message to the modem according to the hang-up instruction, where the first message is used to trigger the modem to directly terminate a call. The modem may terminate the call in a timely manner according to the first message. Therefore, a time consumed in call termination is reduced and efficiency is improved.

20 Claims, 5 Drawing Sheets

An application processor receives a hang-up instruction — 100

The application processor sends a first message to a modem in a mobile terminal according to the hang-up instruction, where the first message is used to trigger the modem to directly terminate a call — 110

Related U.S. Application Data continuation of application No. 15/328,827, filed as application No. PCT/CN2014/082938 on Jul. 24, 2014, now Pat. No. 10,009,954.

(51) Int. Cl.
  *H04W 76/34* (2018.01)
  *H04W 88/02* (2009.01)
  *H04W 76/38* (2018.01)
  *H04W 64/00* (2009.01)

(58) Field of Classification Search
  USPC .......................... 455/445, 550.1, 552.1, 557
  See application file for complete search history.

(56) References Cited

U.S. PATENT DOCUMENTS

| | | |
|---|---|---|
| 6,976,217 B1 | 12/2005 | Vertaschitsch et al. |
| 2002/0028674 A1 | 3/2002 | Slettengren et al. |
| 2005/0207405 A1 | 9/2005 | Dowling |
| 2008/0089290 A1 | 4/2008 | Coulas et al. |
| 2010/0296668 A1 | 11/2010 | Lee et al. |
| 2011/0150202 A1 | 6/2011 | Cheng |
| 2014/0287796 A1 | 9/2014 | Zhao et al. |
| 2015/0080048 A1 | 3/2015 | Fang et al. |

FOREIGN PATENT DOCUMENTS

| | | |
|---|---|---|
| CN | 102104699 A | 6/2011 |
| CN | 102354278 A | 2/2012 |
| CN | 102405494 A | 4/2012 |
| CN | 102647525 A | 8/2012 |
| CN | 103024222 A | 4/2013 |
| CN | 103354667 A | 10/2013 |
| CN | 103685711 A | 3/2014 |
| CN | 1867018 A | 11/2016 |
| WO | WO9635286 A1 | 11/1996 |

OTHER PUBLICATIONS

Chinese office action issued in Chinese application No. 201480066449 dated Dec. 28, 2018, 9 pages.
Extended European Search Report issued in European Application No. 14898270.5 dated Jun. 29, 2017, 9 pages.
International Search Report issued in International Application No. PCT/CN2014/082938 dated Apr. 17, 2018, 18 pages.
Office Action issued in Chinese Application No. 201480066449.6 dated Sep. 4, 2019, 6 pages (with English translation).

CALL TERMINATION METHOD, APPLICATION PROCESSOR, AND MODEM

CROSS-REFERENCE TO RELATED APPLICATIONS

This application a continuation of U.S. patent application Ser. No. 16/004,980, filed on Jun. 11, 2018, which is a continuation of U.S. patent application Ser. No. 15/328,827, filed on Jan. 24, 2017, which is a national stage of International Application No. PCT/CN2014/082938, filed on Jul. 24, 2014. All of the aforementioned applications are hereby incorporated by reference in their entireties.

TECHNICAL FIELD

The present invention relates to the field of communications technologies, and in particular, to a call termination method, an application processor, and a modem.

BACKGROUND

With development of communications technologies, mobile terminals are increasingly widely used. In terms of a hardware structure, a mobile terminal is divided into two parts: an application processor and a modem.

When a mobile terminal receives a call setup instruction, a communication process between an AP and a modem is as follows:

Step a1. The AP sends a dial command to the modem when receiving the call setup instruction.

Step b1. The modem sends a request message to a network side according to the dial command.

Step c1. After receiving a response message that is fed back by the network side, the modem sets up a call and returns an acknowledgement message to the AP.

The acknowledgement message carries a call identity, and the call identity is used to identify this call.

Step d1. The AP changes an interface of the mobile terminal from a dial interface to a call interface according to the received acknowledgement message.

When a mobile terminal receives a hang-up instruction, a communication process between an AP and a modem is as follows:

Step a2. The AP sends a disconnect message to the modem when receiving the hang-up instruction, and the disconnect message includes a call identity of a to-be-terminated call.

Step b2. The modem sends a disconnect message to a network side.

Step c2. After receiving a response message that is fed back by the network side, the modem releases a resource of the call indicated by the call identity carried in the disconnect message, and feeds back a response message to the AP, to feed back a call termination success.

Step d2. According to the received response message, the AP exits from a call interface and returns to an initial interface.

In practical application, when entering a no-service area such as an elevator, the mobile terminal is disconnected from a network. In this case, when the mobile terminal receives a hang-up instruction, whether the mobile terminal is during a call or in a dial process, a relatively long time needs to be consumed to stop this call for the following reasons:

If a mobile terminal enters a no-service area during a call, when the mobile terminal receives a call termination instruction, the following process is performed:

Step a3. An AP sends a disconnect message to a modem, where the disconnect message includes a call identity of a to-be-terminated call.

Step b3. The modem sends a disconnect message to a network side according to the call identity, and starts a timer T305.

Step c3. After duration specified by the timer T305 expires, if the modem receives no response message that is fed back by the network side, the modem sends a disconnect message to the network side again and starts a timer T308.

Step d3. After duration specified by the timer T308 expires, if the modem still receives no response message that is fed back by the network side, the modem releases a resource of a call indicated by the call identity carried in the disconnect message, and feeds back a response message to the AP, to feed back a call termination success.

Step e3. According to the received response message, the AP exits from a call interface and returns to an initial interface.

In this scenario, when the mobile terminal receives a hang-up instruction, the mobile terminal does not terminate this call immediately, but terminates this call after a sum of duration specified by the T305 and duration specified by the T308 expires. Therefore, a disadvantage of a relatively long consumed time exists in a call termination process when the mobile terminal enters a no-service area.

If a mobile terminal enters a no-service area in a dial process, the mobile terminal checks a service status after receiving a dial instruction when the mobile terminal enters the no-service area. When checking that the service status at this time is an out-of-service state, the mobile terminal initiates a network searching operation and starts a redial mechanism at the same time (preset redial duration is 30 seconds). If a modem finds no network after the 30 seconds, the modem feeds back a response message to an AP and terminates this call. The AP cannot send a disconnect message to the modem if the mobile terminal receives a call termination instruction within the 30 seconds. In this scenario, a mobile terminal does not terminate a call immediately when the mobile terminal receives a call termination instruction, but terminates this call after preset redial duration expires. Therefore, a disadvantage of a relatively long consumed time exists in a call termination process of the mobile terminal.

SUMMARY

Embodiments of the present invention provide a call termination method, an application processor, and a modem, to resolve a problem in a call termination process of a mobile terminal that a long time is consumed and efficiency is relatively low.

Specific technical solutions provided in the embodiments of the present invention are as follows:

According to a first aspect, a processing method for call termination is provided, including:

receiving, by an application processor, a hang-up instruction; and sending, by the application processor, a first message to a modem in the mobile terminal according to the hang-up instruction, where the first message is used to trigger the modem to directly terminate a call.

With reference to the first aspect, in a first possible implementation manner, before the sending, by the application processor, a first message to a modem in the mobile terminal according to the hang-up instruction, the method further includes:

when the application processor is in a connection state or is not in a mobility original pending state, sending, by the application processor to the modem, a second message that carries a call identity of a to-be-terminated call, where the second message is used to trigger the modem to terminate the call indicated by the call identity; and determining, by the application processor, that no response message that is fed back by the modem in response to the second message is received within preset duration, where the preset duration is less than 60 seconds.

With reference to the first possible implementation manner of the first aspect, in a second possible implementation manner, the first message is a disconnect message that carries a direct call termination instruction; or the first message is a direct disconnect message that carries the call identity of the to-be-terminated call.

With reference to the second possible implementation manner of the first aspect, in a third possible implementation manner, the direct call termination instruction is obtained after a value is assigned to another bit except a significant bit in the call identity of the to-be-terminated call in the disconnect message.

With reference to the first aspect, in a fourth possible implementation manner, before the sending, by the application processor, a first message to a modem in the mobile terminal according to the hang-up instruction, the method further includes:

determining, by the application processor, that the application processor is in a mobility original pending state.

With reference to the fourth possible implementation manner of the first aspect, in a fifth possible implementation manner, the first message is a disconnect message that carries a preset identity; or the first message is a direct disconnect message that carries a preset identity.

With reference to the fifth possible implementation manner of the first aspect, in a sixth possible implementation manner, in the preset identity, all 16 top bits are 1 and all 16 down bits are 0.

According to a second aspect, a processing method for call termination is provided, including:

receiving, by a modem, a first message sent by an application processor in a mobile terminal in which the modem is located, where the first message is used to trigger the modem to directly terminate a call; and directly terminating, by the modem, the call according to the first message.

With reference to the second aspect, in a first possible implementation manner, before the receiving, by a modem, a first message sent by an application processor in a mobile terminal in which the modem is located, the method further includes:

receiving, by the modem, a second message that carries a call identity of a to-be-terminated call and is sent by the application processor, where the second message is used to trigger the modem to terminate the call indicated by the call identity.

With reference to the second aspect or the first possible implementation manner of the second aspect, in a second possible implementation manner, the first message is a disconnect message that carries a direct call termination instruction; or the first message is a direct disconnect message that carries the call identity of the to-be-terminated call.

With reference to the second possible implementation manner of the second aspect, in a third possible implementation manner, the direct call termination instruction is obtained after a value is assigned to another bit except a significant bit in the call identity of the to-be-terminated call in the disconnect message.

With reference to the second or the third possible implementation manner of the second aspect, in a fourth possible implementation manner, the terminating, by the modem, the call according to the first message includes:

when determining that there is a call identity matching the direct call termination instruction carried in the first message, terminating, by the modem, a call corresponding to the matched call identity.

With reference to the second or the third possible implementation manner of the second aspect, in a fifth possible implementation manner, the terminating, by the modem, the call according to the first message includes:

when determining that there is no call identity matching the direct call termination instruction carried in the first message and there is a call in a dial state, terminating, by the modem, the call in the dial state.

With reference to the third or the fourth possible implementation manner of the second aspect, in a sixth possible implementation manner, the determining, by the modem, that there is a call identity matching the direct call termination instruction carried in the first message includes:

determining, by the modem, that there is a call identity matching the significant bit in the direct call termination instruction carried in the first message; and the determining, by the modem, that there is no call identity matching the direct call termination instruction carried in the first message includes:

determining, by the modem, that there is no call identity matching the significant bit in the direct call termination instruction carried in the first message.

With reference to the second aspect or the first possible implementation manner of the second aspect, in a seventh possible implementation manner, the first message is a disconnect message that carries a preset identity; or the first message is a direct disconnect message that carries a preset identity.

With reference to the sixth possible implementation manner of the second aspect, in an eighth possible implementation manner, the directly terminating, by the modem, the call according to the first message includes:

when determining that the preset identity carried in the first message is a preset value and there is a call in a dial state, terminating, by the modem, the call in the dial state.

With reference to the fifth or the seventh possible implementation manner of the second aspect, in a ninth possible implementation manner, the directly terminating, by the modem, the call in the dial state includes:

terminating, by the modem, the call in the dial state by performing a call termination operation or stopping a redial operation.

According to a third aspect, a processing method for call termination is provided, including:

receiving, by a modem, a disconnect message sent by an application processor in a mobile terminal in which the modem is located;

sending, by the modem, a disconnect message to a network side; and terminating, by the modem, a call when determining that no response message that is fed back by the network side is received within preset duration, and sending, to the application processor, a response message used to indicate a call termination success, where the preset duration is less than 60 seconds.

With reference to the third aspect, in a first possible implementation manner, the disconnect message carries a call identity of a to-be-terminated call; and after the receiving, by a modem, a disconnect message sent by an application processor in a mobile terminal, the method further includes:

releasing, by the modem according to the call identity, a resource used by the call corresponding to the call identity.

According to a fourth aspect, an application processor is provided, including:

a receiving unit, configured to receive a hang-up instruction; and a sending unit, configured to send a first message to a modem in the mobile terminal according to the hang-up instruction, where the first message is used to trigger the modem to directly terminate a call.

With reference to the fourth aspect, in a first possible implementation manner, the application processor further includes a first determining unit, where the first determining unit is configured to: when the application processor is in a connection state or is not in a mobility original pending state, send, to the modem, a second message that carries a call identity of a to-be-terminated call; and determine that no response message that is fed back by the modem in response to the second message is received within preset duration, where the second message is used to trigger the modem to terminate the call indicated by the call identity, and the preset duration is less than 60 seconds.

With reference to the first possible implementation manner of the fourth aspect, in a second possible implementation manner, the first message sent by the sending unit is a disconnect message that carries a direct call termination instruction; or the first message sent by the sending unit is a direct disconnect message that carries the call identity of the to-be-terminated call.

With reference to the second possible implementation manner of the fourth aspect, in a third possible implementation manner, the direct call termination instruction carried in the disconnect message sent by the sending unit is obtained after a value is assigned to another bit except a significant bit in the call identity of the to-be-terminated call in the disconnect message.

With reference to the fourth aspect, in a fourth possible implementation manner, the application processor further includes a second determining unit, where the second determining unit is configured to determine that the application processor is in a mobility original pending state.

With reference to the fourth possible implementation manner of the fourth aspect, in a fifth possible implementation manner, the first message sent by the sending unit is a disconnect message that carries a preset identity; or the first message sent by the sending unit is a direct disconnect message that carries a preset identity.

With reference to the fifth possible implementation manner of the fourth aspect, in a sixth possible implementation manner, in the preset identity in the first message sent by the sending unit, all 16 top bits are 1 and all 16 down bits are 0.

According to a fifth aspect, a modem is provided, including:

a receiving unit, configured to receive a first message sent by an application processor in a mobile terminal in which the modem is located, where the first message is used to trigger the modem to directly terminate a call; and a processing unit, configured to directly terminate the call according to the first message.

With reference to the fifth aspect, in a first possible implementation manner, the receiving unit is further configured to:

receive a second message that carries a call identity of a to-be-terminated call and is sent by the application processor, where the second message is used to trigger the modem to terminate the call indicated by the call identity.

With reference to the fifth aspect or the first possible implementation manner of the fifth aspect, in a second possible implementation manner, the first message received by the receiving unit is a disconnect message that carries a direct call termination instruction; or the first message received by the receiving unit is a direct disconnect message that carries the call identity of the to-be-terminated call.

With reference to the second possible implementation manner of the fifth aspect, in a third possible implementation manner, the direct call termination instruction carried in the disconnect message received by the receiving unit is obtained after a value is assigned to another bit except a significant bit in the call identity of the to-be-terminated call in the disconnect message.

With reference to the second or the third possible implementation manner of the fifth aspect, in a fourth possible implementation manner, the processing unit is specifically configured to:

when it is determined that there is a call identity matching the direct call termination instruction carried in the first message, terminate a call corresponding to the matched call identity.

With reference to the second or the third possible implementation manner of the fifth aspect, in a fifth possible implementation manner, the processing unit is specifically configured to:

when it is determined that there is no call identity matching the direct call termination instruction carried in the first message and there is a call in a dial state, terminate the call in the dial state.

With reference to the third or the fourth possible implementation manner of the fifth aspect, in a sixth possible implementation manner, the first message received by the receiving unit is a disconnect message that carries a preset identity; or the first message received by the receiving unit is a direct disconnect message that carries a preset identity.

With reference to the fifth aspect or the first possible implementation manner of the fifth aspect, in a seventh possible implementation manner, the processing unit is specifically configured to:

when it is determined that the preset identity carried in the first message is a preset value and there is a call in a dial state, terminate the call in the dial state.

With reference to the sixth possible implementation manner of the fifth aspect, in an eighth possible implementation manner, that the processing unit terminates the call in the dial state includes:

the processing unit terminates the call in the dial state by performing a call termination operation or stopping a redial operation.

According to a sixth aspect, a modem is provided, including:

a receiving unit, configured to receive a disconnect message sent by an application processor in a mobile terminal in which the modem is located; and a processing unit, configured to: send a disconnect message to a network side, terminate a call when it is determined that the receiving unit receives, within preset duration, no response message that is fed back by the network side, and send to the application processor, a response message used to indicate a call termination success, where the preset duration is less than 60 seconds.

With reference to the sixth aspect, in a first possible implementation manner, the disconnect message received by the receiving unit carries a call identity of a to-be-terminated call; and the modem further includes a release unit, where the release unit is configured to release, according to the call identity, a resource used by the call corresponding to the call identity.

According to a seventh aspect, a mobile terminal is provided, including: the application processor according to any one of the fourth aspect or the first to the sixth possible implementation manners of the fourth aspect, and the modem according to any one of the fifth aspect or the first to the eighth possible implementation manners of the fifth aspect.

According to an eighth aspect, a mobile terminal is provided, including: the application processor according to any one of the fourth aspect or the first to the sixth possible implementation manners of the fourth aspect, and the modem according to the sixth aspect or the first possible implementation manner of the sixth aspect.

In the prior art, when a mobile terminal enters a no-service area, if the mobile terminal is during a call, this call is terminated only after a sum of duration specified by a T305 and duration specified by a T308 expires, that is, the call can be terminated only after approximately 60 seconds. If the mobile terminal is in a dial state, a redial mechanism is started (preset redial duration is approximately 30 seconds), and if a modem still finds no network after 30 seconds, the modem feeds back a response message to an application processor to terminate this call. In this way, a disadvantage of a relatively long consumed time and relatively low efficiency exists in an existing call termination solution. In the call termination solution provided in embodiments of the present invention, an application processor receives a hang-up instruction and sends a first message to a modem according to the hang-up instruction, where the first message is used to trigger the modem to directly terminate a call. The modem may terminate the call in a timely manner according to the first message. Therefore, a time consumed in call termination is reduced and efficiency is improved.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the following, embodiments of the present invention are described in detail with reference to the accompanying drawings. It should be understood that the embodiments of the present invention described herein are merely used to illustrate and explain the present invention, but are not intended to limit the present invention. In addition, the embodiments of the present application and features in the embodiments may be mutually combined if they do not conflict with each other.

It should be noted that the hang-up instruction involved in this specification refers to an instruction used for call termination, for example, a disconnect instruction, and the disconnect message involved in this specification refers to a message used for call termination, for example, a disconnect message.

It should be understood that the mobile terminal involved in this specification (for example, a mobile phone) includes an application processor and a modem.

In the following, preferred implementation manners of the present invention are described in detail with reference to the accompanying drawings.

Figure 1:
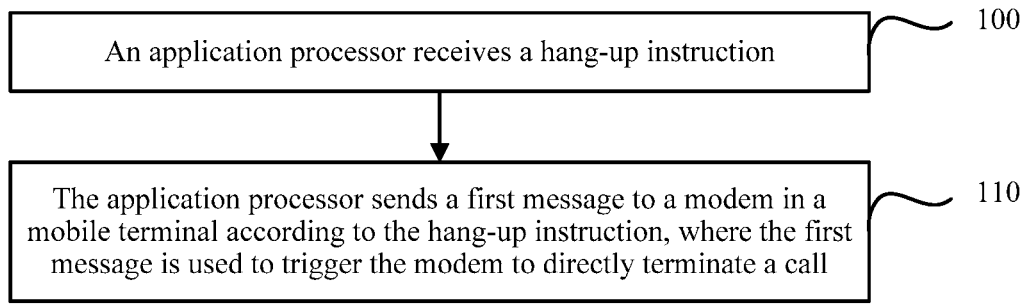
FIG. 1 is a flowchart of call termination according to an embodiment of the present invention.

Referring to FIG. 1, in an embodiment of the present invention, a call termination procedure applied to a mobile terminal in an out-of-service state is as follows:

Step 100. An application processor receives a hang-up instruction.

Step 110. The application processor sends a first message to a modem in the mobile terminal according to the hang-up instruction, where the first message is used to trigger the modem to directly terminate a call.

In this embodiment of the present invention, before the sending, by the application processor, a first message to a modem in the mobile terminal according to the hang-up instruction, the following operations are further included:

when the application processor is in a connection state or is not in a mobility original pending (English: Mobility Original Pending) state, sending, by the application processor to the modem, a second message that carries a call identity of a to-be-terminated call, where the second message is used to trigger the modem to terminate the call indicated by the call identity; and determining, by the application processor, that no response message that is fed back by the modem in response to the second message is received within preset duration, where the preset duration is less than 60 seconds.

In this embodiment of the present invention, optionally, the preset duration is 2.5 seconds. Certainly, the preset duration varies in different application scenarios, and details are not described herein.

In the foregoing process, whether the application processor is during a call may be determined in a manner of determining whether the application processor is in a connection state, or whether the application processor is during a call may be determined in a manner of determining whether the application processor is in a mobility original pending state. Certainly, in practical application, whether the application processor is during a call may be determined in another manner, and details are not described herein.

In this embodiment of the present invention, when the application processor is in a connection state or is not in a mobility original pending state, the first message is a disconnect message that carries a direct call termination instruction.

That is, the first message may be in a same format as the disconnect message except that the disconnect message carries the direct call termination instruction, but other content is the same as that of the disconnect message. In this case, the modem determines, according to the direct call termination instruction in the disconnect message, whether to directly terminate the call. For example, the direct call termination instruction is a 32-bit identity, where all 8 top bits or all 16 top bits are 1, 8 down bits are the call identity of the to-be-terminated call, and the 8 top bits or the 16 top bits are used to indicate that the identity is a direct call termination instruction; the modem needs to perform a direct termination operation on the call corresponding to the call identity identified by the 8 down bits.

Alternatively, the first message is a direct disconnect message that carries the call identity of the to-be-terminated call. That is, the first message may be in a different format from an existing disconnect message, and is a message in another format. The modem directly terminates the call when receiving the message in this format.

In this embodiment of the present invention, the direct call termination instruction is obtained after a value is assigned to another bit except a significant bit in the call identity of the to-be-terminated call in the disconnect message.

In this embodiment of the present invention, before the sending, by the application processor, a first message to a modem in the mobile terminal according to the hang-up instruction, the following operation is further included:

determining that the application processor is in a mobility original pending state.

When the application processor is in a mobility original pending state (that is, a dial state), the first message also includes at least two forms: a disconnect message and a direct disconnect message, where each of the two messages carries a preset identity.

In this embodiment of the present invention, the preset identity may be pre-stored in the mobile terminal, and used to trigger the modem to directly release a call that is in a mobility original pending state. For example, a format of the preset identity is that all 16 top bits are 1 and all 16 down bits are 0. Certainly, the preset identity may be in another form, and details are not described herein.

In this embodiment of the present invention, that the modem is triggered to directly terminate the call means that the modem directly performs call termination without performing another operation when the modem is terminating the call, and the another operation includes but is not limited to the following manners:

for example, starting a timer, or starting a redial mechanism.

It should be understood that the direct disconnect message involved in this specification is a message different from the existing disconnect message.

Figure 2:
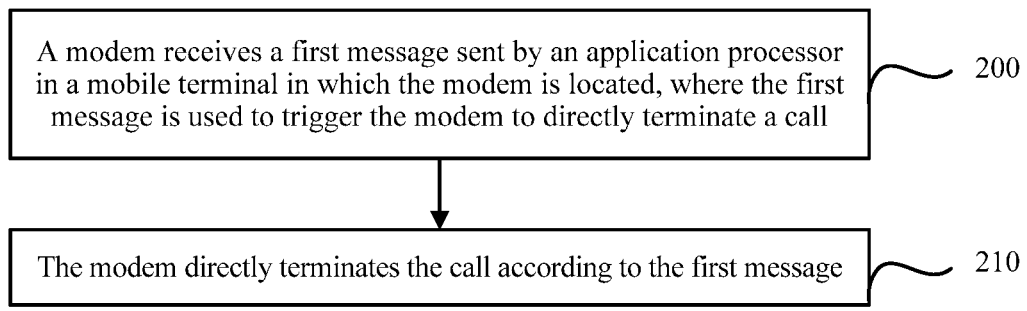
FIG. 2 is another flowchart of call termination according to an embodiment of the present invention.

Referring to FIG. 2, in an embodiment of the present invention, another call termination procedure applied to a mobile terminal in an out-of-service state is as follows:

Step 200. A modem receives a first message sent by an application processor in a mobile terminal in which the modem is located, where the first message is used to trigger the modem to directly terminate a call.

Step 210. The modem directly terminates the call according to the first message.

In the embodiment of the present invention, before the sending, by the application processor, a first message to a modem in the mobile terminal according to the hang-up instruction, the following operation is further included:

when the application processor is in a connection state or is not in a mobility original pending (English: Mobility Original Pending) state, sending, by the application processor to the modem, a second message that carries a call identity of a to-be-terminated call, where the second message is used to trigger the modem to terminate the call indicated by the call identity.

Therefore, in this embodiment of the present invention, before the receiving, by the modem, a first message sent by an application processor in a mobile terminal in which the modem is located, the following operation is further included:

receiving, by the modem, a second message that carries a call identity of a to-be-terminated call and is sent by the application processor, where the second message is used to trigger the modem to terminate the call indicated by the call identity.

In this embodiment of the present invention, the first message is a disconnect message that carries a direct call termination instruction, that is, the first message is in a same format as an existing disconnect message but carries different content, where the direct call termination instruction in the disconnect message is obtained after a value is assigned to another bit except a significant bit in the call identity of the to-be-terminated call in the disconnect message.

Alternatively, the first message is a direct disconnect message that carries the call identity of the to-be-terminated call, that is, the direct disconnect message is different from an existing disconnect message.

In this embodiment of the present invention, there are multiple manners for the modem to terminate the call according to the first message. Optionally, the following operation may be used:

when it is determined that there is a call identity matching the direct call termination instruction carried in the first message, terminating a call corresponding to the matched call identity, or when it is determined that there is no call identity matching the direct call termination instruction carried in the first message and there is a call in a dial state, terminating the call in the dial state.

In an alternative solution of the foregoing solution, whether the direct call termination instruction carried in the first message is a preset value may be directly determined. If the direct call termination instruction is a preset value, and a call in a dial state exists, the call in the dial state is terminated.

In this embodiment of the present invention, there are multiple manners for the modem to determine that there is a call identity matching the direct call termination instruction carried in the first message. Optionally, the following manner may be used:

determining, by the modem, that there is a call identity matching the significant bit in the direct call termination instruction carried in the first message.

Likewise, there are multiple manners for the modem to determine that there is no call identity matching the direct call termination instruction carried in the first message. Optionally, the following manner may be used:

determining, by the modem, that there is no call identity matching the significant bit in the direct call termination instruction carried in the first message.

In this embodiment of the present invention, the first message is a disconnect message that carries a preset identity; or the first message is a direct disconnect message that carries a preset identity.

In this case, there are multiple manners for the modem to terminate the call according to the first message. Optionally, the following manner may be used:

when determining that the preset identity carried in the first message is a preset value and there is a call in a dial state, terminating, by the modem, the call in the dial state.

In this embodiment of the present invention, there are multiple manners for the modem to terminate the call in the dial state. Optionally, the modem terminates the call in the dial state by performing a call termination operation or stopping a redial operation.

In this embodiment of the present invention, that the modem is triggered to directly terminate the call means that the modem directly performs call termination without performing another operation when the modem is terminating the call, and the another operation includes but is not limited to the following manners:

for example, starting a timer, or starting a redial mechanism.

In this embodiment of the present invention, the direct disconnect message is a message different from the existing disconnect message.

In conclusion, in the embodiments of the present invention, two call termination methods are separately provided from perspectives of an application processor and a modem. The application processor receives a hang-up instruction and sends, to the modem according to the hang-up instruction, a first message used to trigger the modem to directly terminate a call. The modem may terminate the call in a timely manner according to the first message. If a mobile terminal is during a call, the mobile terminal does not need to terminate this call after a sum of duration specified by a T305 and duration specified by a T308 expires. If the mobile terminal is in a dial state, the mobile terminal does not need to terminate this call after preset redial duration expires, either. Therefore, a time consumed in call termination is reduced and efficiency is improved.

Figure 3:
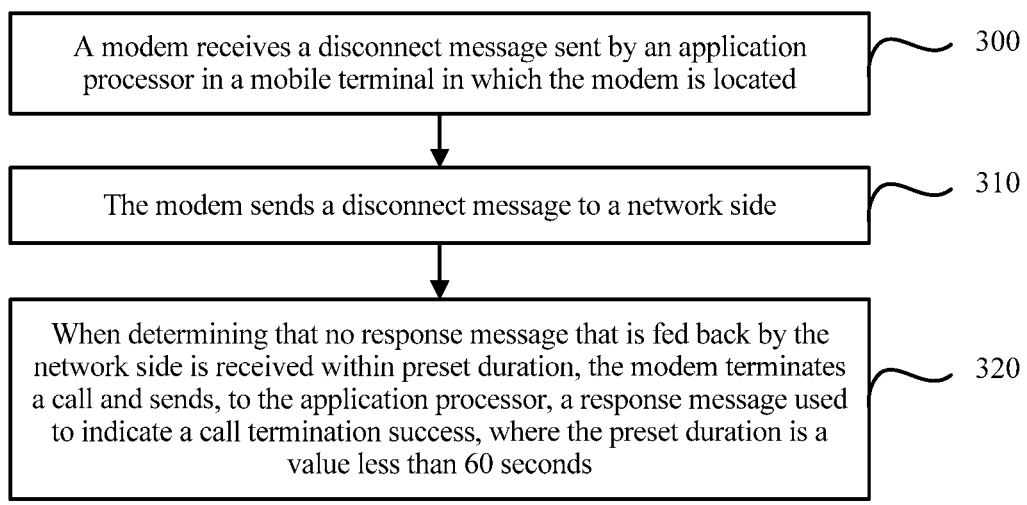
FIG. 3 is another flowchart of call termination according to an embodiment of the present invention.

Referring to FIG. 3, in an embodiment of the present invention, another call termination procedure applied to a mobile terminal in a connection state or not in a mobility original pending state is as follows:

Step 300. A modem receives a disconnect message sent by an application processor in a mobile terminal in which the modem is located.

Step 310. The modem sends a disconnect message to a network side.

Step 320. When determining that no response message that is fed back by the network side is received within preset duration, the modem terminates a call and sends, to the application processor, a response message used to indicate a call termination success, where the preset duration is less than 60 seconds.

In this embodiment of the present invention, optionally, the disconnect message carries a call identity of a to-be-terminated call.

Further, in this embodiment of the present invention, after the receiving, by the modem, a disconnect message sent by an application processor in a mobile terminal in which the modem is located, the following operation is further included:

releasing, by the modem according to the call identity, a resource used by the call corresponding to the call identity.

Figure 4:
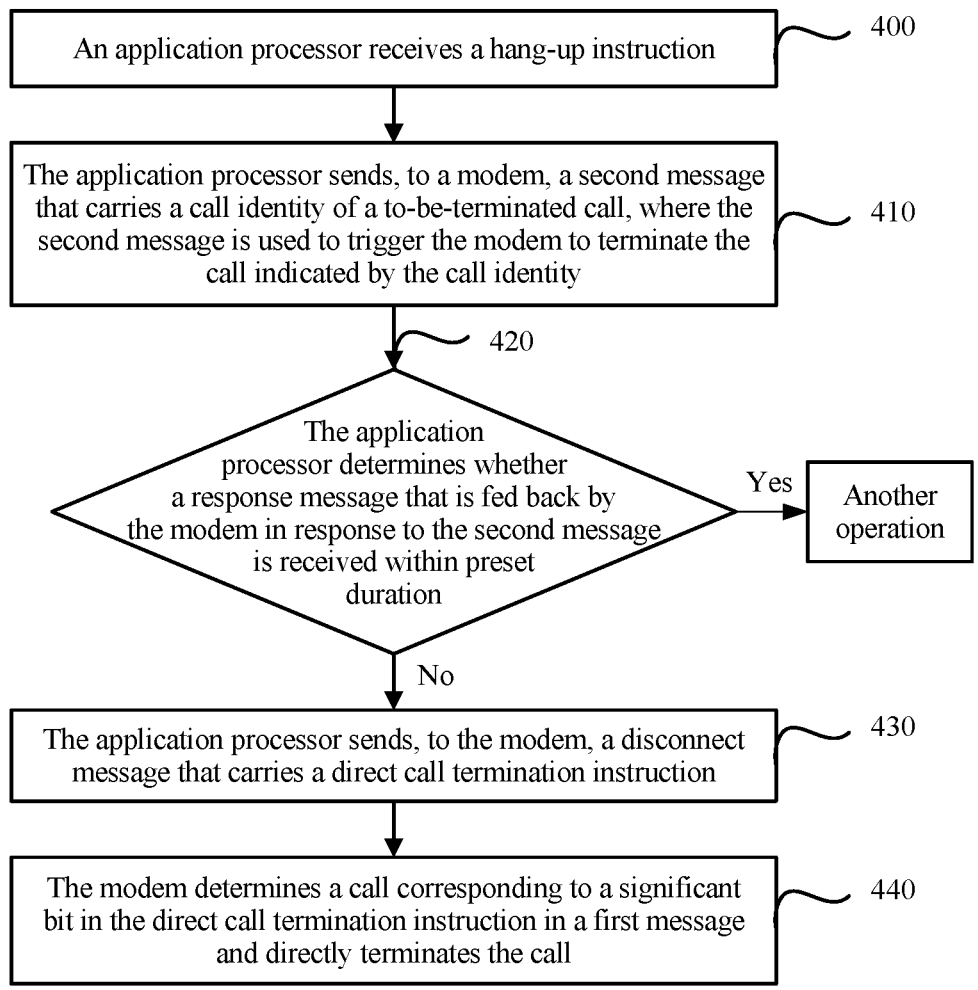
FIG. 4 is another flowchart of call termination according to an embodiment of the present invention.

For better understanding of this embodiment of the present invention, as shown in FIG. 4, a specific application scenario is provided in the following to further describe a call termination process in detail.

Step 400. An application processor receives a hang-up instruction.

Step 410. The application processor sends, to a modem, a second message that carries a call identity of a to-be-terminated call, where the second message is used to trigger the modem to terminate the call indicated by the call identity.

Step 420. The application processor determines whether a response message that is fed back by the modem in response to the second message is received within preset duration; if the response message is received within the preset duration, another operation is performed, and otherwise, step 430 is performed.

Step 430. The application processor sends, to the modem, a disconnect message that carries a direct call termination instruction.

Step 440. The modem determines a call corresponding to a significant bit in the direct call termination instruction in a first message, and directly terminates the call.

In this embodiment of the present invention, another solution is provided and applied to a scenario in which a mobile terminal is in a connection state or is not in a mobility original pending state. A modem sends a disconnect message to a network side after receiving a disconnect message sent by an application processor. Within preset duration, if no response message that is fed back by the network side is received, the modem terminates a call and sends, to the application processor, a response message used to indicate a call termination success, where the preset duration is less than 60 seconds. The modem does not need to terminate this call after a sum of duration specified by a T305 and duration specified by a T308 expires. Therefore, a time consumed in call termination is reduced and efficiency is improved.

Figure 5A:
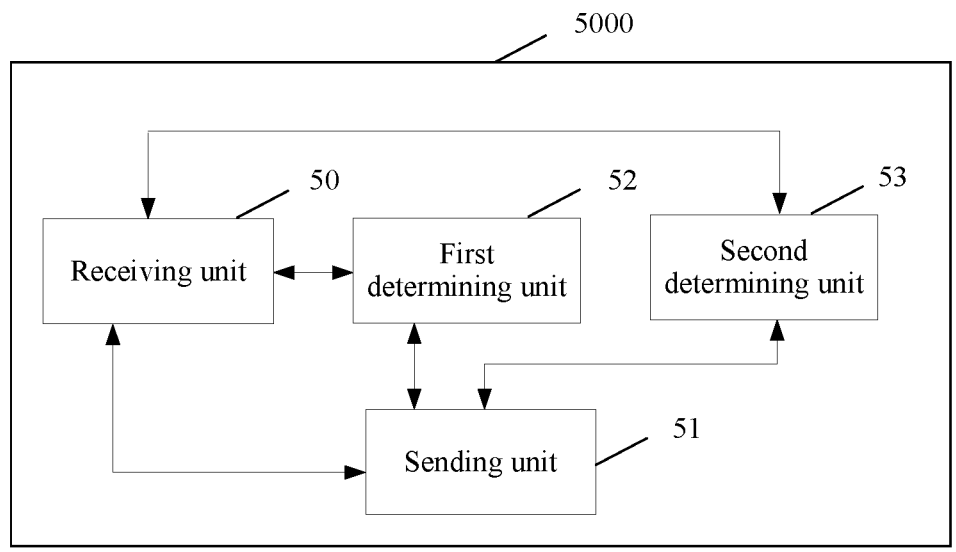
FIG. 5A is a schematic structural diagram of an application processor according to an embodiment of the present invention.

Based on the technical solution of the foregoing corresponding method, referring to FIG. 5A, an embodiment of the present invention provides a schematic structural diagram of an application processor 5000, and the application processor 5000 includes a receiving unit 50 and a sending unit 51, where:

the receiving unit 50 is configured to receive a hang-up instruction; and the sending unit 51 is configured to send a first message to a modem in the mobile terminal according to the hang-up instruction, where the first message is used to trigger the modem to directly terminate a call.

Optionally, in this embodiment of the present invention, the application processor further includes a first determining unit 52, where the first determining unit 52 is configured to: when the application processor is in a connection state or is not in a mobility original pending state, send, to the modem, a second message that carries a call identity of a to-be-terminated call; and determine that no response message that is fed back by the modem in response to the second message is received within preset duration, where the second message is used to trigger the modem to terminate the call indicated by the call identity, and the preset duration is less than 60 seconds.

Optionally, the first message sent by the sending unit 51 is a disconnect message that carries a direct call termination instruction; or the first message sent by the sending unit 51 is a direct disconnect message that carries the call identity of the to-be-terminated call.

Optionally, the direct call termination instruction carried in the disconnect message sent by the sending unit 51 is obtained after a value is assigned to another bit except a significant bit in the call identity of the to-be-terminated call in the disconnect message.

Optionally, the application processor 5000 further includes a second determining unit 53, where the second determining unit 53 is configured to determine that the application processor is in a mobility original pending state.

Optionally, the first message sent by the sending unit 51 is a disconnect message that carries a preset identity; or the first message sent by the sending unit 51 is a direct disconnect message that carries a preset identity.

Optionally, in the preset identity in the first message sent by the sending unit 51, all 16 top bits are 1 and all 16 down bits are 0.

Figure 5B:
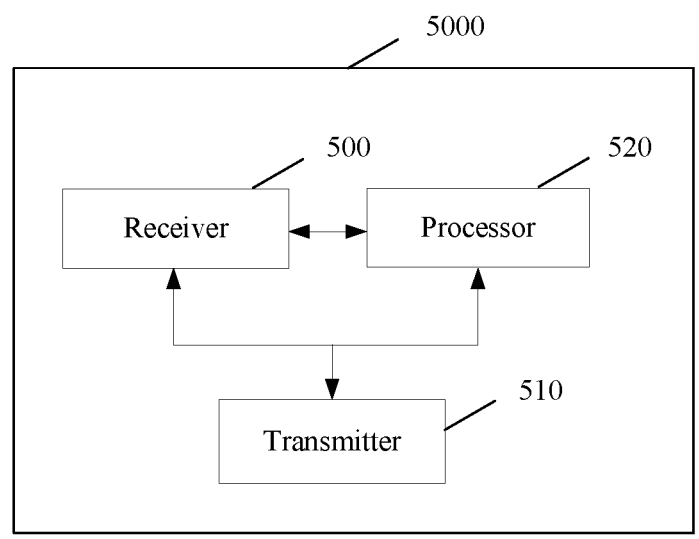
FIG. 5B is another schematic structural diagram of an application processor according to an embodiment of the present invention.

As shown in FIG. 5B, FIG. 5B is a schematic structural diagram of an application processor 5000 provided in an embodiment of the present invention. The application processor 5000 includes a receiver 500 and a transmitter 510, where the receiver 500 is configured to receive a hang-up instruction; and the transmitter 510 is configured to send a first message to a modem in the mobile terminal according to the hang-up instruction received by the receiver 500, where the first message is used to trigger modulation and further includes a processor 520, and the processor 520 is configured to: when the application processor is in a connection state or is not in a mobility original pending state, send, to the modem, a second message that carries a call identity of a to-be-terminated call; and determine that no response message that is fed back by the modem in response to the second message is received within preset duration, where the second message is used to trigger the modem to terminate the call indicated by the call identity, and the preset duration is less than 60 seconds.

Optionally, the first message sent by the transmitter 510 is a disconnect message that carries a direct call termination instruction; or the first message sent by the transmitter 510 is a direct disconnect message that carries the call identity of the to-be-terminated call.

Optionally, the direct call termination instruction carried in the disconnect message sent by the transmitter 510 is obtained after a value is assigned to another bit except a significant bit in the call identity of the to-be-terminated call in the disconnect message.

Optionally, the processor 520 is configured to determine that the application processor 5000 is in a mobility original pending state.

Optionally, the first message sent by the transmitter 510 is a disconnect message that carries a preset identity; or the first message sent by the transmitter 510 is a direct disconnect message that carries a preset identity.

Optionally, in the preset identity in the first message sent by the transmitter 510, all 16 top bits are 1 and all 16 down bits are 0.

It should be understood that the application processor provided in this embodiment of the present invention may correspond to the application processor in the foregoing communication method, and operations and/or functions of modules in the application processor are separately used to implement the corresponding procedure of the method in FIG. 1. For simplicity, details are not described herein.

The application processor provided in this embodiment of the present invention receives a hang-up instruction, and sends, to a modem according to the hang-up instruction, a first message used to trigger the modem to directly terminate a call. The modem may terminate the call in a timely manner according to the first message. If a mobile terminal is during a call, the mobile terminal does not need to terminate this call after a sum of duration specified by a T305 and duration specified by a T308 expires. If the mobile terminal is in a dial state, the mobile terminal does not need to terminate this call after preset redial duration expires, either. Therefore, a time consumed in call termination is reduced and efficiency is improved.

Figure 6A:
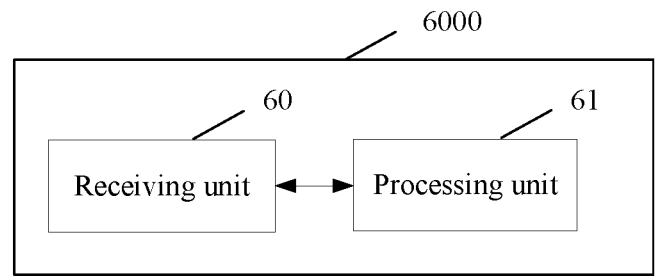
FIG. 6A is a schematic structural diagram of a modem according to an embodiment of the present invention.

Based on the technical solution of the foregoing corresponding method, referring to FIG. 6A, an embodiment of the present invention provides a modem 6000, and the modem 6000 includes a receiving unit 60 and a processing unit 61, where:

the receiving unit 60 is configured to receive a first message sent by an application processor in a mobile terminal in which the modem is located, where the first message is used to trigger the modem to directly terminate a call; and the processing unit 61 is configured to directly terminate the call according to the first message.

Further, in this embodiment of the present invention, the receiving unit 60 is further configured to:

receive a second message that carries a call identity of a to-be-terminated call and is sent by the application processor, where the second message is used to trigger the modem to terminate the call indicated by the call identity.

Optionally, the first message received by the receiving unit 60 is a disconnect message that carries a direct call termination instruction; or the first message received by the receiving unit 60 is a direct disconnect message that carries the call identity of the to-be-terminated call.

Optionally, the direct call termination instruction carried in the disconnect message received by the receiving unit 60 is obtained after a value is assigned to another bit except a significant bit in the call identity of the to-be-terminated call in the disconnect message.

In this embodiment of the present invention, optionally, the processing unit 61 is specifically configured to:

when it is determined that there is a call identity matching the direct call termination instruction carried in the first message, terminate a call corresponding to the matched call identity.

In this embodiment of the present invention, optionally, the processing unit 61 is specifically configured to:

when it is determined that there is no call identity matching the direct call termination instruction carried in the first message and there is a call in a dial state, terminate the call in the dial state.

In this embodiment of the present invention, optionally, the first message received by the receiving unit 60 is a disconnect message that carries a preset identity; or the first message received by the receiving unit 60 is a direct disconnect message that carries a preset identity.

In this embodiment of the present invention, optionally, the processing unit 61 is specifically configured to:

when it is determined that the preset identity carried in the first message is a preset value and there is a call in a dial state, terminate the call in the dial state.

In this embodiment of the present invention, optionally, that the processing unit 61 terminates the call in the dial state includes:

the processing unit 61 terminates the call in the dial state by performing a call termination operation or stopping a redial operation.

Figure 6B:
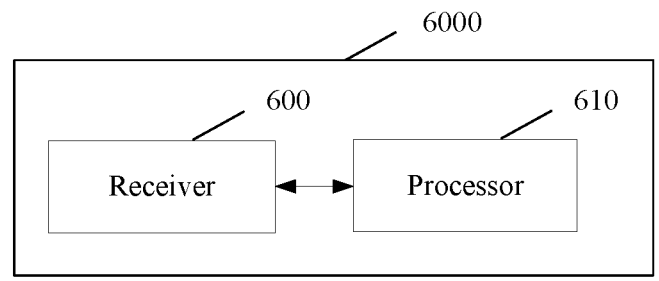
FIG. 6B is another schematic structural diagram of a modem according to an embodiment of the present invention.

As shown in FIG. 6B, FIG. 6B is a schematic structural diagram of a modem 6000 provided in an embodiment of the present invention. The modem 6000 includes a receiver 600 and a processor 610, where the receiver 600 is configured to receive a first message sent by an application processor in a mobile terminal in which the modem is located, where the first message is used to trigger the modem to directly terminate a call; and the processor 610 is configured to directly terminate the call according to the first message.

Further, in this embodiment of the present invention, the receiver 600 is further configured to:

receive a second message that carries a call identity of a to-be-terminated call and is sent by the application processor, where the second message is used to trigger the modem to terminate the call indicated by the call identity.

In this embodiment of the present invention, optionally, the first message received by the receiver 600 is a disconnect message that carries a direct call termination instruction; or the first message received by the receiver 600 is a direct disconnect message that carries the call identity of the to-be-terminated call.

Optionally, the direct call termination instruction carried in the disconnect message received by the receiver 600 is obtained after a value is assigned to another bit except a significant bit in the call identity of the to-be-terminated call in the disconnect message.

Optionally, the processor 610 is specifically configured to: when it is determined that there is a call identity matching the direct call termination instruction carried in the first message, terminate a call corresponding to the matched call identity.

Optionally, the processor 610 is specifically configured to:

when it is determined that there is no call identity matching the direct call termination instruction carried in the first message and there is a call in a dial state, terminate the call in the dial state.

Optionally, the first message received by the receiver 600 is a disconnect message that carries a preset identity; or the first message received by the receiver 600 is a direct disconnect message that carries a preset identity.

Optionally, the processor 610 is specifically configured to: when it is determined that the preset identity carried in the first message is a preset value and there is a call in a dial state, terminate the call in the dial state.

Optionally, that the processor 610 terminates the call in the dial state includes that the processor 610 terminates the call in the dial state by performing a call termination operation or stopping a redial operation.

It should be understood that the modem provided in this embodiment of the present invention may correspond to the application processor in the foregoing communication method, and operations and/or functions of modules in the modem are separately used to implement the corresponding procedure of the method in FIG. 2. For simplicity, details are not described herein.

The modem provided in this embodiment of the present invention receives a first message sent by an application processor in a mobile terminal in which the modem is located, where the first message is used to trigger the modem to directly terminate a call. The modem directly terminates the call according to the first message. If a mobile terminal is during a call, the mobile terminal does not need to terminate this call after a sum of duration specified by a T305 and duration specified by a T308 expires. If the mobile terminal is in a dial state, the mobile terminal does not need to terminate this call after preset redial duration expires, either. Therefore, a time consumed in call termination is reduced and efficiency is improved.

Figure 7A:
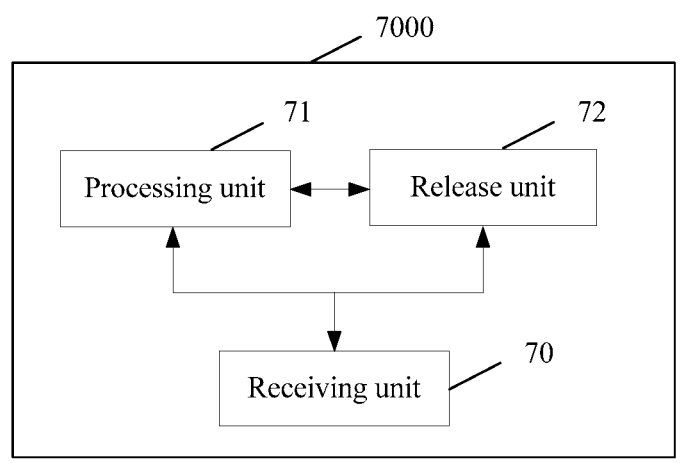
FIG. 7A is another schematic structural diagram of a modem according to an embodiment of the present invention.

Based on the technical solution of the foregoing corresponding method, referring to FIG. 7A, an embodiment of the present invention provides a modem 7000, and the modem 7000 includes a receiving unit 70 and a processing unit 71, where:

the receiving unit 70 is configured to receive a disconnect message sent by an application processor in a mobile terminal in which the modem is located; and the processing unit 71 is configured to: send a disconnect message to a network side, terminate a call when it is determined that the receiving unit 70 receives, within preset duration, no response message that is fed back by the network side, and send, to the application processor, a response message used to indicate a call termination success, where the preset duration is less than 60 seconds.

Optionally, the disconnect message received by the receiving unit 70 carries a call identity of a to-be-terminated call.

Optionally, the modem further includes a release unit 72, where the release unit 72 is configured to release, according to the call identity, a resource used by the call corresponding to the call identity.

Figure 7B:
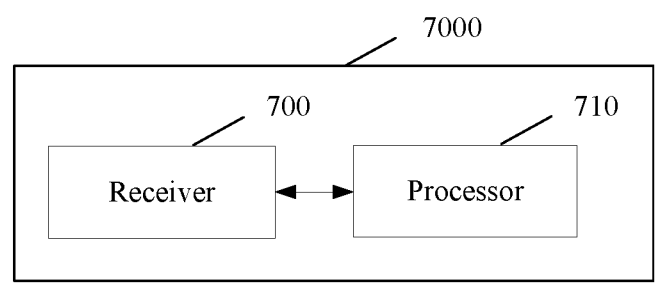
FIG. 7B is another schematic structural diagram of a modem according to an embodiment of the present invention.

As shown in FIG. 7B, FIG. 7B is a schematic structural diagram of a modem 7000 provided in an embodiment of the present invention. The modem 7000 includes a receiver 700 and a processor 710, where the receiver 700 is configured to receive a disconnect message sent by an application processor in a mobile terminal in which the modem is located; and the processor 710 is configured to: send a disconnect message to a network side, terminate a call when it is determined that the receiver 700 receives, within preset duration, no response message that is fed back by the network side, and send, to the application processor, a response message used to indicate a call termination success, where the preset duration is less than 60 seconds.

In this embodiment of the present invention, optionally, the disconnect message received by the receiver 700 carries a call identity of a to-be-terminated call.

Further, the processor 710 is further configured to release, according to the call identity, a resource used by the call corresponding to the call identity.

It should be understood that the modem provided in this embodiment of the present invention may correspond to the modem in the foregoing communication method, and operations and/or functions of modules in the modem are separately used to implement the corresponding procedures of the methods in FIG. 3 and FIG. 4. For simplicity, details are not described herein.

The modem provided in this embodiment of the present invention sends a disconnect message to a network side after the modem receives the disconnect message sent by an application processor. Within preset duration, if no response message that is fed back by the network side is received, the modem terminates a call and sends, to the application processor, a response message used to indicate a call termination success, where the preset duration is less than 60 seconds. The modem does not need to terminate this call after a sum of duration specified by a T305 and duration specified by a T308 expires. Therefore, a time consumed in call termination is reduced and efficiency is improved.

Figure 8:
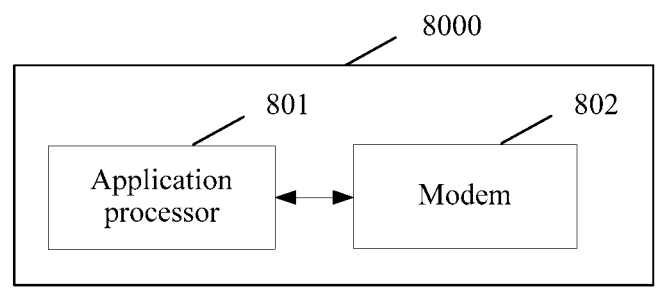
FIG. 8 is a schematic structural diagram of a mobile terminal according to an embodiment of the present invention.

As shown in FIG. 8, an embodiment of the present invention further provides a mobile terminal 8000, and the mobile terminal 8000 includes an application processor 801 and a modem 802. The application processor 801 is the application processor 5000 according to the foregoing embodiment of the present invention, and the modem 802 is the modem 6000 according to the foregoing embodiment of the present invention. Alternatively, the application processor 801 is the application processor 5000 according to the foregoing embodiment of the present invention, and the modem 802 is the modem 7000 according to the foregoing embodiment of the present invention. For details, reference may be specifically made to the foregoing embodiments of the application processor and the modem, and details are not described herein.

The mobile terminal provided in this embodiment of the present invention may reduce a time consumed in terminating a call by the mobile terminal.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A communication apparatus, comprising:
a modem processor;
a memory configured to store programming instructions;
an application processor configured to execute the programming instructions to:
establish a call in response to receiving a call setup instruction;
receive a hang-up instruction after a network signal quality deteriorates;
send a first message to the modem processor in response to receiving the hang-up instruction, wherein the first message instructs the modem processor to terminate the call; and
terminate the call prior to an expiration of a T305 timer and an expiration of a T308 timer.

2. The communication apparatus according to claim 1, wherein the T305 timer is associated with sending a disconnect message to a network, and the T308 timer is associated with an expiration of the T305 timer.

3. The communication apparatus according to claim 1, wherein the modem processor is configured to execute the programming instructions to:
perform a network signal search after detecting a deterioration of network signal quality.

4. The communication apparatus according to claim 1, wherein terminating the call comprises exiting from a call interface of the call.

5. The communication apparatus according to claim 1, wherein the first message comprises a call identification of the call.

6. The communication apparatus according to claim 1, wherein the application processor is further configured to execute the programming instructions to: determine that the application processor is in a connection state after receiving the hang-up instruction.

7. The communication apparatus according to claim 1, wherein the application processor is further configured to execute the programming instructions to: receive a response message indicating a call termination.

8. A communication apparatus, comprising a modem coupled with an application processor, wherein
the application processor is configured to:
change an interface of an electronic device from a dial interface to a call interface for a call between the electronic device and another electronic device;
receive a hang-up instruction;
send a first message to the modem in response to receiving the hang-up instruction, wherein the first message instructs the modem to terminate the call; and
exit from the call interface to terminate the call; and
the modem is configured to:
receive the first message;
in response to receiving the first message, send a disconnect message to a network and start a first timer; and
wait for a response to the disconnect message from the network for a duration specified by the first timer;
wherein the call interface is exited to terminate the call before the response to the disconnect message from the network is received.

9. The communication apparatus according to claim 8, wherein the modem is further configured to:
perform a network signal search after detecting a deterioration of network signal quality.

10. The communication apparatus according to claim 8, wherein the first message comprises a call identification of the call.

11. The communication apparatus according to claim 8, wherein the application processor is further configured to: receive a response message indicating a termination success of the call from the modem.

12. The communication apparatus according to claim 8, wherein the first timer is a T305 timer.

13. The communication apparatus according to claim 12, wherein the call interface is exited to terminate the call before the duration specified by a T305 timer is expired.

14. A communication apparatus, comprising:
a memory configured to store programming instructions;
an application processor configured to execute the programming instructions to cause the communication apparatus to:
establish a call in response to receiving a call setup instruction;
receive a hang-up instruction after a network signal quality of a network deteriorates;
send a first message to a modem processor in response to receiving the hang-up instruction, wherein the first message instructs the modem processor to terminate the call; and
terminate the call without waiting for a period of time corresponding to a T305 timer and without waiting for receiving a response from the network.

15. The communication apparatus according to claim 14, wherein the T305 timer is associated with sending a disconnect message to a network.

16. The communication apparatus according to claim 14, wherein the application processor is further configured to execute the programming instructions to cause the communication apparatus to:
receive a message indicating a termination success of the call from the modem processor.

17. The communication apparatus according to claim 14, wherein terminating the call comprises exiting from a call interface of the call.

18. The communication apparatus according to claim 14, wherein the first message comprises a call identification of the call.

19. The communication apparatus according to claim 14, wherein terminating the call comprises:
terminating the call within a preset duration, wherein the preset duration is less than 60 seconds.

20. The communication apparatus according to claim 14, wherein the period of time corresponding to the T305 timer is 30 seconds.

* * * * *